United States Patent
Barthel et al.

(10) Patent No.: US 9,297,454 B2
(45) Date of Patent: Mar. 29, 2016

(54) GEAR UNIT WITH IMPROVED LUBRICANT SUPPLY

(71) Applicants: Thomas Barthel, Voerde (DE); Jan-Dirk Reimers, Aachen (DE); Jörg Tebroke, Rhede (DE); Ulrich Weinsdörfer, Aachen (DE)

(72) Inventors: Thomas Barthel, Voerde (DE); Jan-Dirk Reimers, Aachen (DE); Jörg Tebroke, Rhede (DE); Ulrich Weinsdörfer, Aachen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 302 days.

(21) Appl. No.: 13/689,159

(22) Filed: Nov. 29, 2012

(65) Prior Publication Data
US 2013/0133454 A1 May 30, 2013

(30) Foreign Application Priority Data
Nov. 30, 2011 (EP) .................... 11191335

(51) Int. Cl.
*F16H 57/04* (2010.01)
*F01M 1/02* (2006.01)
*F01M 11/00* (2006.01)
*F03D 11/00* (2006.01)
*F16N 7/40* (2006.01)

(52) U.S. Cl.
CPC ............ *F16H 57/0447* (2013.01); *F01M 1/02* (2013.01); *F01M 11/0004* (2013.01); *F03D 11/0008* (2013.01); *F16H 57/045* (2013.01); *F16H 57/0423* (2013.01); *F16H 57/0442* (2013.01); *F16H 57/0456* (2013.01); *F16H 57/0457* (2013.01); *F16H 57/0495* (2013.01); *F16N 7/40* (2013.01); *Y10T 74/19995* (2015.01)

(58) Field of Classification Search
CPC ............ F16H 57/0442; F16H 57/0447; F16H 57/045; F01M 1/02; F01M 11/004
USPC .............................. 184/6.12, 6.18, 11.1, 13.1
See application file for complete search history.

(56) References Cited

U.S. PATENT DOCUMENTS

| | | | | |
|---|---|---|---|---|
| 3,800,913 | A * | 4/1974 | Schmitt | 184/6.13 |
| 4,169,519 | A * | 10/1979 | Hirt et al. | F16H 57/0456 184/6.12 |
| 4,309,916 | A * | 1/1982 | Ohkuma et al. | 74/467 |
| 5,159,910 | A * | 11/1992 | Ninomiya et al. | 123/196 AB |
| 5,662,188 | A | 9/1997 | Ito et al. | |
| 6,374,949 | B2 * | 4/2002 | Schwertberger | 184/6.4 |
| 7,878,304 | B2 * | 2/2011 | Reis et al. | 184/6.12 |

(Continued)

FOREIGN PATENT DOCUMENTS

| | | |
|---|---|---|
| CN | 102084128 A | 6/2011 |
| CN | 102121524 A | 7/2011 |

(Continued)

*Primary Examiner* — Michael Mansen
*Assistant Examiner* — Minh Truong
(74) *Attorney, Agent, or Firm* — Henry M. Feiereisen LLC.

(57) ABSTRACT

In order to implement a reliable supply of lubricant to gear unit components during emergency or spinning operation of a gear unit, level control is provided in a lubricant sump of the gear unit as a function of the operating state by means of a control unit associated with a lubricant pump. During normal operation the level is adjusted to dry sump level. In contrast, the lubricant pump is switched off in emergency or spinning operation, so that a splash lubrication level is automatically achieved in the lubricant sump.

16 Claims, 4 Drawing Sheets

(56) References Cited

U.S. PATENT DOCUMENTS

| | | | |
|---|---|---|---|
| 8,123,493 B2* | 2/2012 | Yoshimura et al. | 417/228 |
| 2002/0053489 A1* | 5/2002 | Schnitzer | 184/6.12 |
| 2009/0299535 A1* | 12/2009 | Delaloye | 700/282 |
| 2010/0000475 A1* | 1/2010 | Kardos et al. | 123/41.31 |
| 2010/0187043 A1* | 7/2010 | Murahashi et al. | 184/6.3 |
| 2011/0012365 A1 | 1/2011 | Becker | |
| 2011/0150655 A1 | 6/2011 | Tietze et al. | |
| 2011/0168495 A1 | 7/2011 | Subramaniam et al. | |

FOREIGN PATENT DOCUMENTS

| | | | |
|---|---|---|---|
| DE | 37 02 008 A1 | 4/1988 | |
| DE | 4132780 A1 | 4/1992 | |
| DE | 10 2005 005 154 A1 | 6/2006 | |
| DE | 10 2007 029 469 A1 | 1/2009 | |
| DE | 10 2009 017 521 B4 | 4/2011 | |
| EP | 0895002 A2 | 2/1999 | |
| GB | 2 201 200 A | 8/1988 | |
| GB | 2201200 A * | 8/1988 | F16N 29/00 |
| WO | WO 2009/112093 A2 | 9/2009 | |

* cited by examiner

GEAR UNIT WITH IMPROVED LUBRICANT SUPPLY

CROSS-REFERENCES TO RELATED APPLICATIONS

This application claims the priority of European Patent Application, Serial No. EP 11 191 335.6, filed Nov. 30, 2011, pursuant to 35 U.S.C. 119(a)-(d), the content of which is incorporated herein by reference in its entirety as if fully set forth herein.

BACKGROUND OF THE INVENTION

The present invention relates to a gear unit for industrial applications or wind turbines.

The following discussion of related art is provided to assist the reader in understanding the advantages of the invention, and is not to be construed as an admission that this related art is prior art to this invention.

In gear units for industrial applications or wind turbines an adequate supply of lubricant to sliding or rolling contacts of bearings, shafts, bolts, running gears or spline gears must be ensured under all operating conditions. Particularly in permanent operation or where there are a large number of load changes, gear units are subject to considerable fatigue stresses in the form of overrollings. Hence machine elements such as gears and bearings require effective and efficient lubrication in order to prevent damage or premature wear. A reliable supply of lubricant is also extremely important for heat dissipation from tribologically stressed machine elements.

Mechanically driven lubricant pumps for gear units are normally designed in respect of their mechanical advantage such that no significant amount of lubricant is pumped until a particular speed of the gear unit is reached. Even though lubricant pumps permit a satisfactory pumping volume even at low speeds, they are subject to extreme stress in a nominal output range of the gear unit and are appreciably overdimensioned for a lower speed range. Furthermore, mechanical lubricant pumps frequently cannot be accommodated in compactly designed gear units because of the space they require.

It would therefore be desirable and advantageous to provide an improved gear unit to obviate prior art shortcomings.

SUMMARY OF THE INVENTION

According to one aspect of the present invention, a gear unit includes a gear unit housing, a drive shaft mounted in the gear unit housing and extending through a first housing opening, an output shaft mounted in the gear unit housing and extending through a second housing opening, at least one gear wheel connected to the drive shaft and at least one gear wheel connected to the output shaft, with the gear wheels directly or indirectly engaging with one another, a lubricant tank having one side connected to a drain of a lubricant sump formed in a base of the housing and another side connected to at least one lubricant feed point for a bearing and/or an adjacent one of the gear wheels, a lubricant compensating reservoir having one side connected to the lubricant tank and another side connected to the at least one lubricant feed point as a function of a lubricant pressure and/or temperature, and a lubricant pump connected to a lubricant circuit comprised of the lubricant sump, the lubricant tank, the lubricant compensating reservoir and the at least one lubricant feed point, and a control unit for adjusting a level in the lubricant sump at least to a dry sump level for normal operation and to a splash lubrication level for emergency or spinning operation when the lubricant pump is switched off in the emergency or spinning operation.

A gear unit according to the present invention is applicable for industrial applications or wind turbines with a lubricant supply system which in all operating states of a drive system comprising the gear unit permits a reliable supply of lubricant and has a reduced energy requirement, in particular in the event of a sudden power failure or in spinning operation. The gear unit has an optimized lubricant supply system in respect of its power needs. By ensuring a splash lubrication level in the lubricant sump in emergency or spinning operation a reliable supply of lubricant is guaranteed at all times, in particular in the event of a sudden power failure. Advantageously, the dry sump level in the lubricant sump is below all gear wheels of the inventive gear unit.

According to another advantageous feature of the present invention, the lubricant compensating reservoir can for example be connected to the lubricant tank and the at least one lubricant feed point by means of a connector which comprises a spring-loaded or nitrogen-loaded membrane. Alternatively, the lubricant compensating reservoir can be connected to the lubricant tank and to the at least one lubricant feed point by a connector which comprises a passive restrictor.

According to another advantageous feature of the present invention, the control unit can be configured to control the level in the lubricant sump exclusively by adjusting a delivery rate of the lubricant pump. This permits a particularly simple implementation of a gear unit according to the present invention on the basis of existing designs. If the lubricant pump is for example set to full delivery rate in normal operation, the control unit for adjusting the level can be implemented particularly easily.

In emergency or spinning operation at least one gear wheel is advantageously immersed at least partially in lubricant in the lubricant sump. In addition, in emergency or spinning operation at least one lubricant collection container can be provided for lubricant collected by at least one rotating gear unit component from the lubricant sump for supplying lubricant for at least one bearing or gear wheel arranged above the lubricant sump.

According to another advantageous feature of the present invention, the lubricant collection container can be connected to a lubricant feed point for the bearing or gear wheel arranged above the lubricant sump via a pipe connection or a lubricant supply channel integrated into the gear unit housing. In this way, even bearings and gear wheels arranged above the splash lubrication level can always be reliably supplied with lubricant in emergency or spinning operation.

According to another advantageous feature of the present invention, the control unit can be configured to adjust the level in the lubricant sump to a splash lubrication level in part-load operation, with the lubricant pump being set in the part-load operation to a reduced delivery rate for transporting lubricant to the at least one lubricant feed point. This permits a further reduction in the power needs for the lubricant supply system of the inventive gear unit.

According to another advantageous feature of the present invention, the lubricant compensating reservoir can be separated in part-load operation from the lubricant tank and from the at least one lubricant feed point by an actuating element or passive switch element. A splash lubrication level can thereby easily be implemented in the lubricant sump during part-load operation.

According to another advantageous feature of the present invention, the lubricant compensating reservoir can have a volume which corresponds to an amount of lubricant in the lubricant sump for splash lubrication. Advantageously, the control unit can be configured to switch from emergency or spinning operation to part-load operation as a function of lubricant temperature and/or viscosity. Thus it can be ensured that only sufficiently temperature-adjusted or fluid lubricant is used for pressure-feed or force-feed lubrication during part-load or normal operation. As an alternative or in addition, a heat exchanger or heating element can be arranged in the lubricant compensating reservoir or lubricant tank for this purpose.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
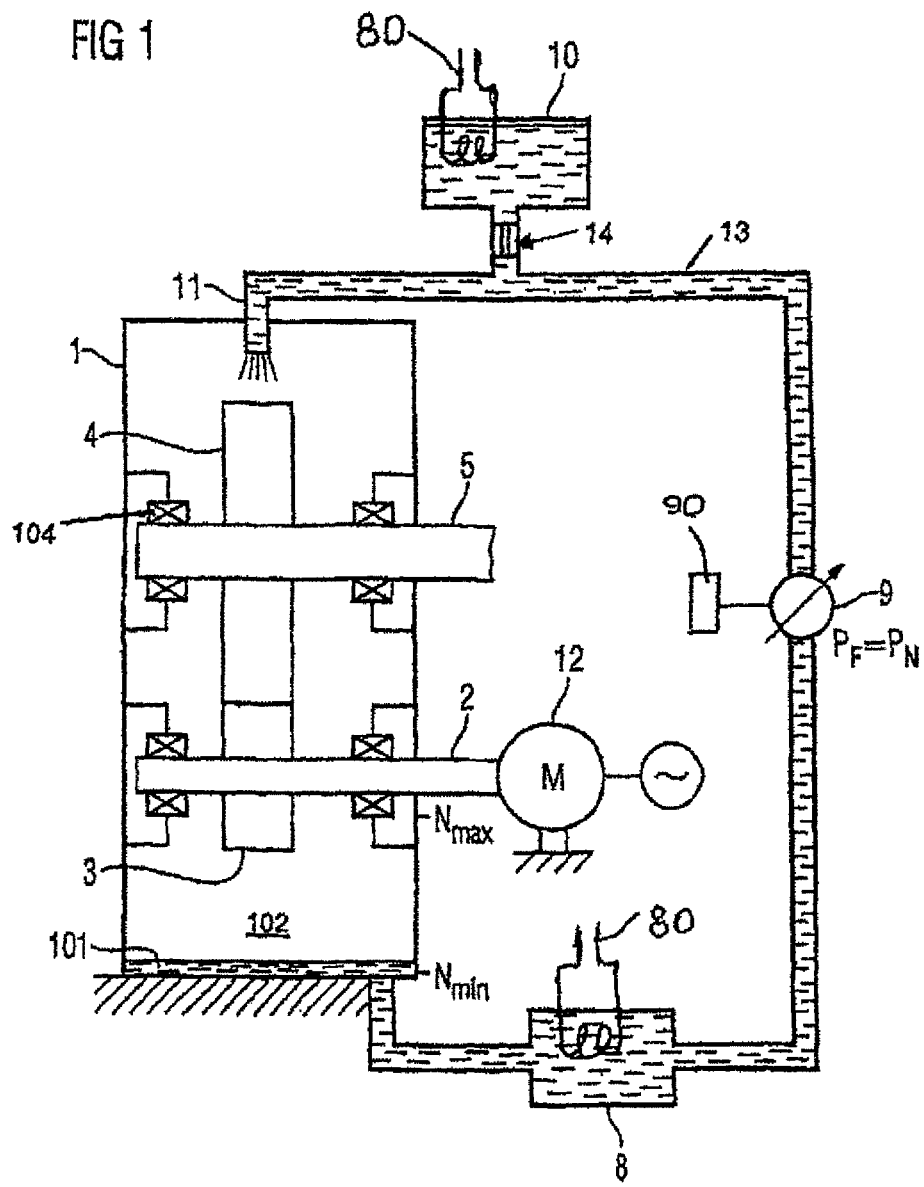
FIG. 1 shows a schematic illustration of a gear unit according to the present invention in normal operation.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a gear unit according to the present invention. The gear unit has a gear unit housing 1 and two spur gears 3, 4 which are accommodated in the gear unit housing 1 and engage with one another. A drive shaft 2 and an output shaft 5 which are mounted in the gear unit housing 1 emerge through respective openings on the gear unit housing 1. The spur gear 3 is connected to the drive shaft 2 in rotationally fixed manner, while the output shaft 5 is connected to the spur gear 4 in rotationally fixed manner. The drive shaft 2 is connected to an electric motor 12 via a coupling. The following embodiments apply irrespective of this similarly for applications in which a gear unit is connected to a generator, for example in a wind turbine.

A lubricant tank 8 is arranged outside the gear unit housing 1 in the present exemplary embodiment, which on one side is connected to a drain of a lubricant sump 102 formed on a housing base and on the other side to at least one lubricant feed point 11 for the output-side spur gear 4. For pressure-feed or force-feed lubrication at least one spatter nozzle is provided at the lubricant feed point 11. In addition to the lubricant tank 8, a lubricant compensating reservoir 10 is provided, and is connected to a pipe connection 13 between the lubricant tank 8 and the lubricant feed point 11 as a function of lubricant pressure or temperature. The lubricant compensating reservoir 10 can be connected to the pipe connection 13 between the lubricant tank 8 and the lubricant feed point 11 by a connector 14 which comprises a spring-loaded or nitrogen-loaded membrane. Alternatively, the lubricant compensating reservoir 10 can be connected to the pipe connection 13 between the lubricant tank 8 and the lubricant feed point 11 by a connector 14 which comprises a passive restrictor. The lubricant compensating reservoir 10 is filled with lubricant in normal operation using the membrane or passive restrictor and is drained in emergency or spinning operation, with a time delay depending on operating requirements. Draining the lubricant compensating reservoir 10 causes lubricant 101 to flow back into the lubricant sump 102 and there reach a splash lubrication level, without any auxiliary power, valve, pump or controller being required for this. Thus a reliable supply of lubricant 101 is guaranteed in emergency or spinning operation, in particular in the case of a power failure.

A lubricant pump 9 which can be adjusted in respect to its delivery rate is also connected to a lubricant circuit comprising the lubricant sump 102, the lubricant tank 8, the lubricant compensating reservoir 10 and the lubricant feed point 11. The lubricant pump 9 comprises an integrated control unit 90 for adjusting the level in the lubricant sump 102. Thanks to the control unit 90 the lubricant 101 is adjusted in the lubricant sump 102 to dry sump level (see FIG. 1) for normal operation and to splash lubrication level (see FIG. 3) for emergency or spinning operation. The dry sump level in the lubricant sump 102 is in this case below all gear wheels.

The level in the lubricant sump 102 is adjusted exclusively by adjusting the delivery rate of the lubricant pump. In emergency or spinning operation the lubricant pump 9 is switched off completely, so that the drive-side spur gear 3 is immersed in lubricant 101 in the lubricant sump 102 and gear unit components are supplied with lubricant exclusively by means of splash lubrication.

Figure 4:
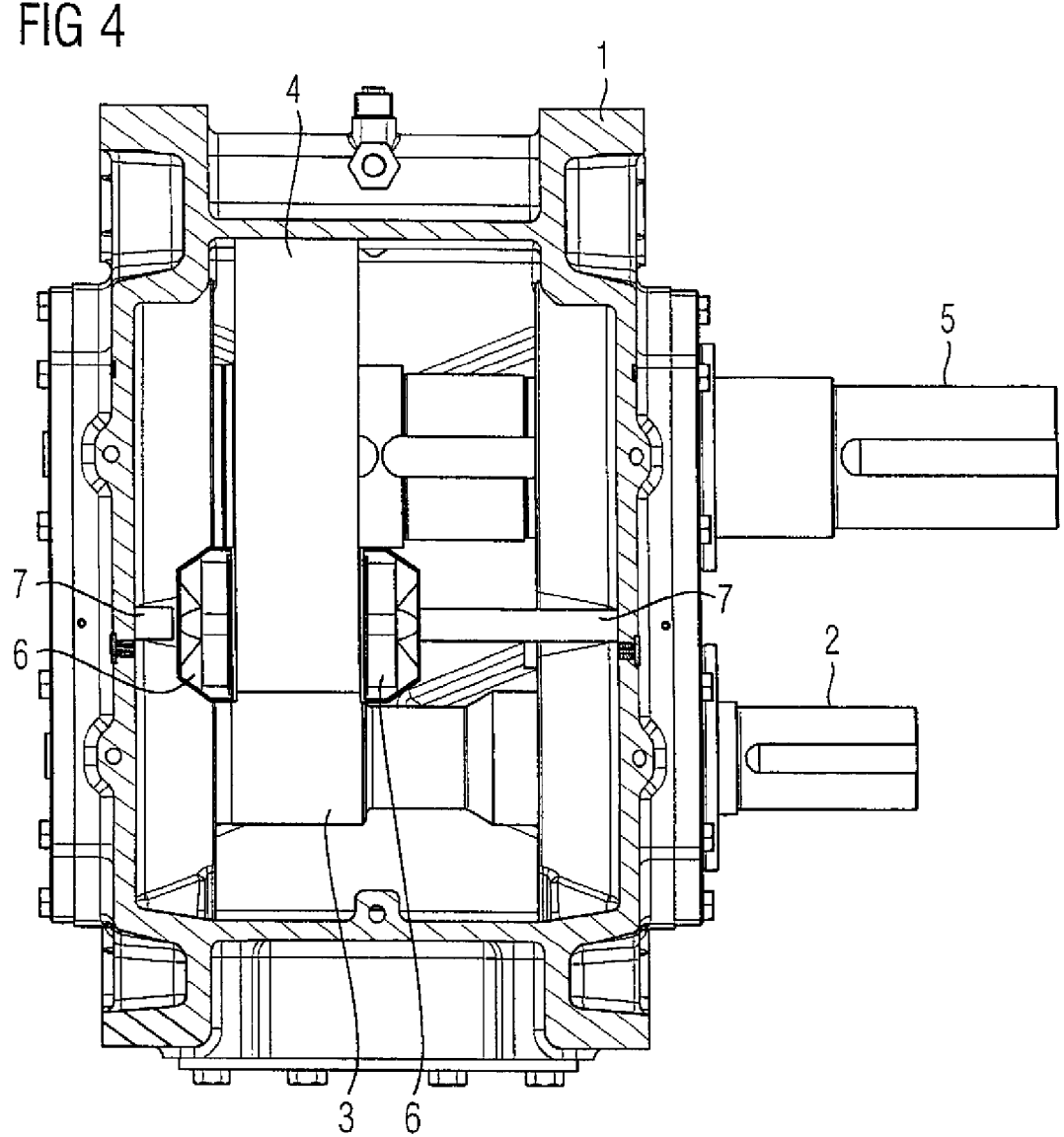
FIG. 4 shows a sectional view of the gear unit of FIG. 1 with two lubricant collection containers arranged on an end face on a spur gear.
Figure 5:
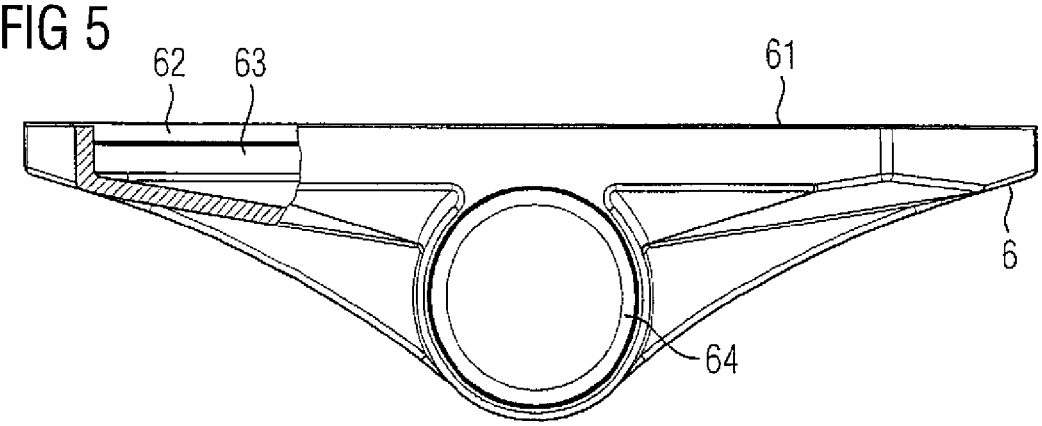
FIG. 5 shows a side view of a lubricant collection container according to FIG. 4.

According to FIG. 4 two lubricant collection containers 6 for lubricant 101 collected by the drive-side spur gear 3 from the lubricant sump 102 and further transported by the output-side spur gear 4 are provided for supplying lubricant 101 to the output-side spur gear 4 arranged above the lubricant sump 102 in emergency or spinning operation. A lubricant collection container 6 made of plastic is arranged respectively at both end faces of an output-side spur gear 4. In accordance with the side view according to FIG. 5 each lubricant collection container 6 comprises a top opening 61 for collecting caught or injected lubricant and a base section with a socket-shaped component 64 for forwarding lubricant to a lubrication point in the gear unit. A lubricant stripper 62 is molded onto the opening 61 of the lubricant collection container 6, is formed as an edge standing proud of the output-side spur gear 4 and is oriented toward an external radial end-face surface of the output-side spur gear 4. The external radial end-face surface of the output-side spur gear 4 is here ground or polished.

The lubricant collection container 6 has a slot-like opening 63 below the lubricant stripper 62 extending parallel to the lubricant stripper 62 and delimited thereby. The base section of the lubricant collection container 6 is respectively connected by the socket-shaped component 64 to a pipe connection 7, via which collected lubricant is forwarded to other lubrication points in the gear unit, in particular to bearings 104 of the output shaft 5.

In normal operation the lubricant pump 9 is set to full delivery rate. Conditional upon lubricant pressure or temperature the lubricant compensating reservoir 10 is completely filled with lubricant in normal operation, so that the lubricant 101 in the lubricant sump 102 drops to the dry sump level (see FIG. 1). The lubricant compensating reservoir 10 in this case has a volume corresponding to an amount of lubricant 101 in the lubricant sump 102 for splash lubrication (see FIG. 3). Gear unit components to be supplied with lubricant are in normal operation exclusively pressure-lubricated or force-lubricated via the lubricant feed point 11 or other spatter nozzles not explicitly shown. Compared to splash lubrication this permits more energy-efficient operation and/or optimum efficiency.

Figure 2:
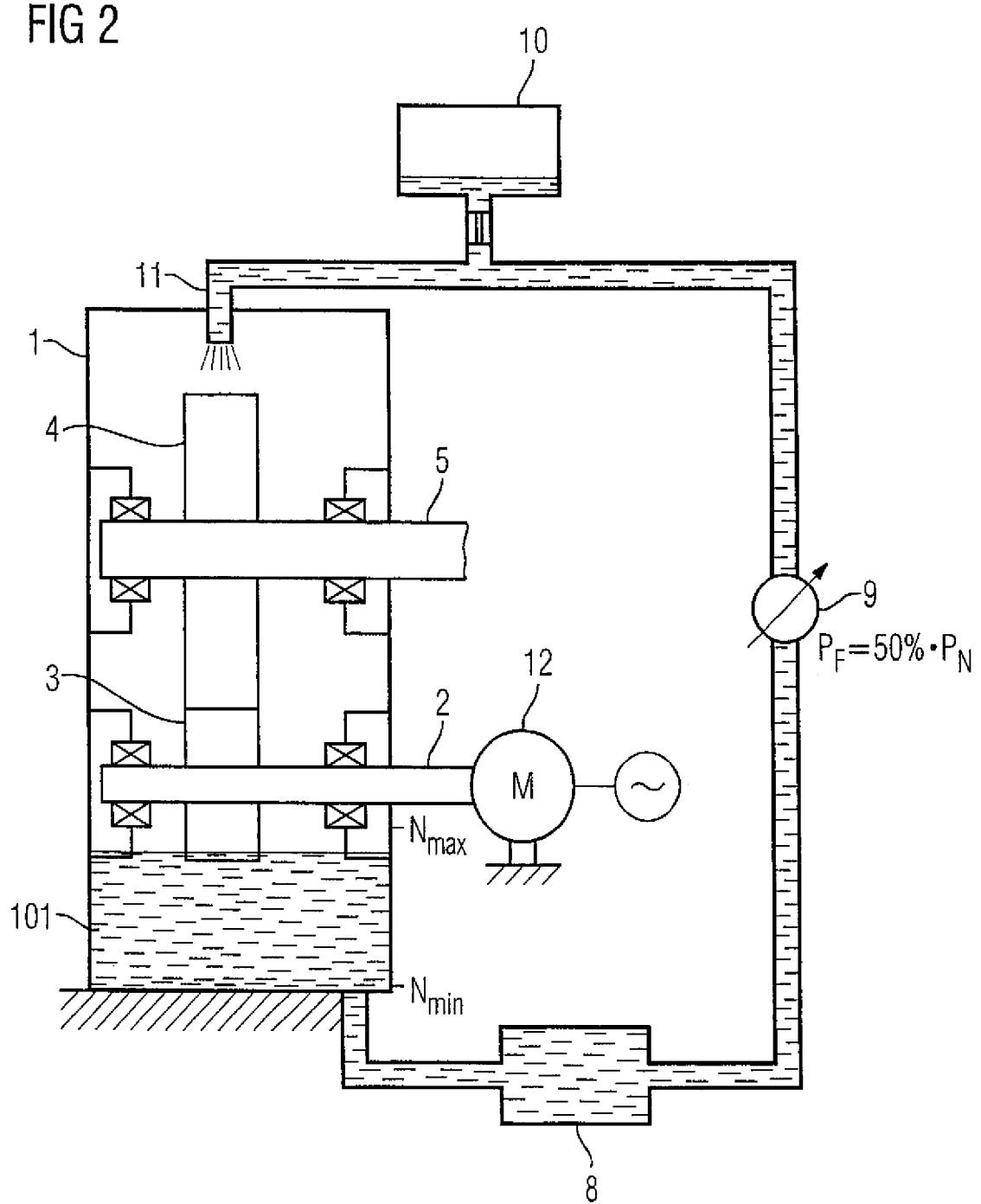
FIG. 2 shows a schematic illustration of the gear unit of FIG. 1 in part-load operation.

Besides emergency or spinning operation and normal operation, part-load operation is provided, during which in accordance with FIG. 2 a splash lubrication level is defined for adjusting the level of lubricant 101 in the lubricant sump 102. Because of partial splash lubrication in part-load operation the full delivery rate of the lubricant pump 9 is not required, so that in part-load operation it is advantageously set to a reduced delivery rate for transporting lubricant to the lubricant feed point 11. The result is reduced circulation rates for the lubricant. Thus especially in the case of low temperatures and a cold start it is possible to compensate for the reduced fluidity of the lubricant.

In addition, in part-load operation the lubricant compensating reservoir 10 can be separated from the pipe connection 13 between lubricant tank 8 and lubricant feed point 11 by an actuating element or passive switch element, so that the lubricant compensating reservoir 10 collects only a reduced amount of lubricant, or none at all, in part-load operation. Part-load operation is thus characterized overall by a combination of splash lubrication on the one hand and pressure-feed or force-feed lubrication on the other hand. Because quadratically speed-dependent splashing losses conditional upon splash lubrication can be compensated for in part-load operation by reduced energy consumption of the lubricant pump 9, a considerable saving in energy is achieved in part-load operation, which in turn protects both the lubricant and the lubricant pump 9. Furthermore, in part-load operation the reduced circulation rates for the lubricant mean it does not need to be completely filtered.

Figure 3:
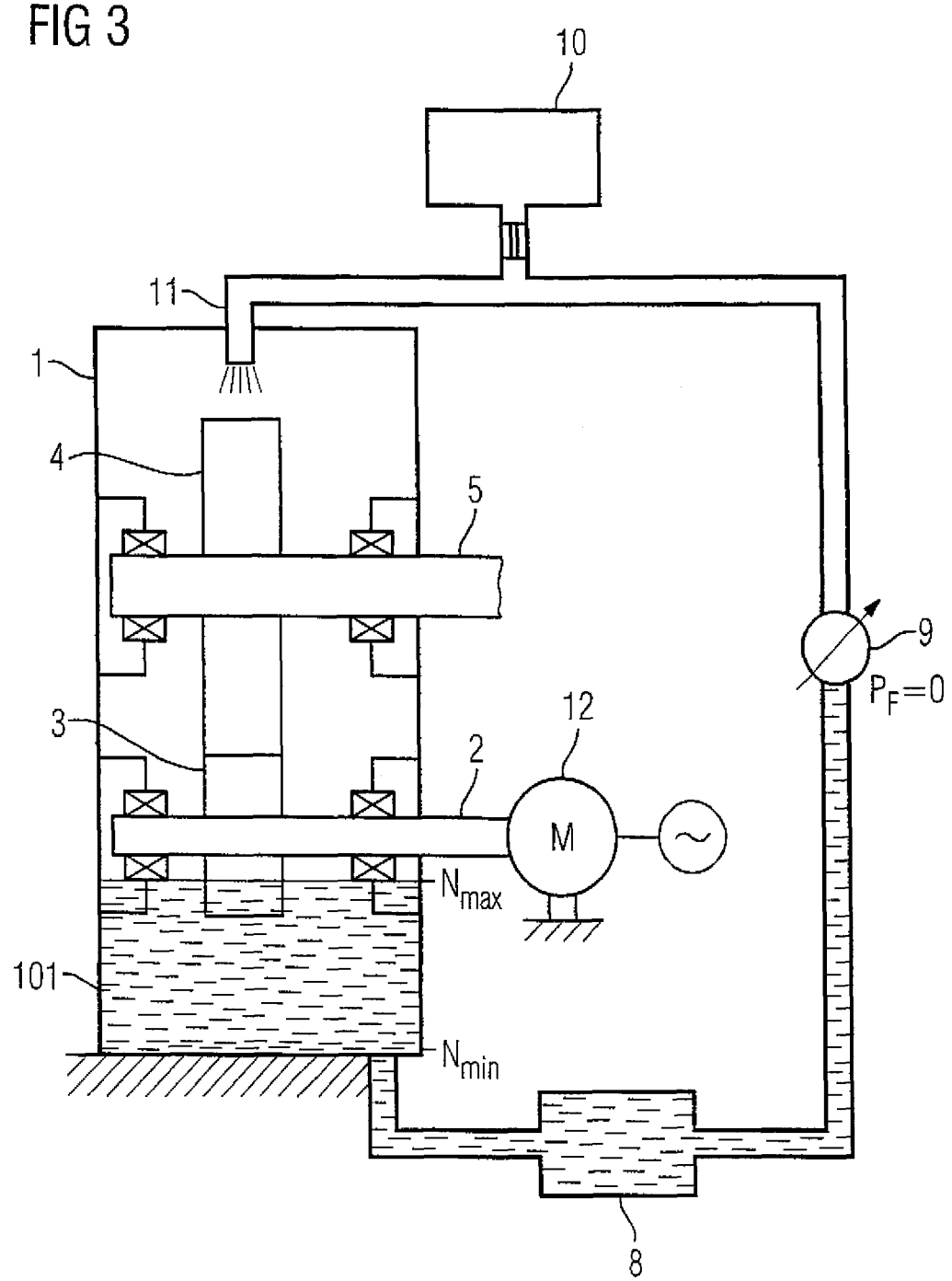
FIG. 3 shows a schematic illustration of the gear unit of FIG. 1 in emergency or spinning operation.

The control unit 90 therefore is configured to adjust a level of the lubricant sump 102 to a dry sump level by pressure-feed or force-feed lubrication for normal operation as shown in FIG. 1, to a medium sump level by splash lubrication for part-load operation as shown in FIG. 2, and to a high sump level by splash lubrication for emergency or spinning operation as shown in FIG. 3.

The control unit for adjusting the level is preferably designed such that a switch from emergency or spinning operation to part-load operation is effected as a function of lubricant temperature or viscosity. A switch from part-load operation to normal operation can also be effected as a function of lubricant temperature or viscosity.

In conventional oil supply systems, startups in dry sump systems at low temperatures are in particular extremely complex because even with heating and controlled operation management complete control of oil viscosity is not readily possible. Oil normally cools very rapidly in unheated gear units because of the large masses of steel present there. This can lead to oil freezing at critical bearings and never reaching a sump region. As a result oil can be pressed outward by a revolving gear unit in uncontrolled pump operation. The resultant lack of lubrication can cause damage in the gear unit, in particular when local overheating occurs.

This can be prevented with the present invention by effecting controlled warming by means firstly of emergency or spinning operation with splash lubrication and then part-load operation with combined splash and pressure-feed or force-feed lubrication when lubricant is in the gear unit when the gear unit is started up. Only when the lubricant in particular has warmed up sufficiently is part-load or normal operation permitted by the control unit 90 associated with the lubricant pump 9. A transition from part-load operation to normal operation is effected simply by increasing the delivery rate of the lubricant pump 9. This in turn leads to an increase in lubricant pressure. As a result lubricant 101 is fed via the connector 14 of the lubricant compensating reservoir 10 at the pipe connection 13 between lubricant tank 8 and lubricant feed point 11 into the lubricant compensating reservoir 10. This results in a reduction of the lubricant 101 in the lubricant sump 102 to a dry sump level. If when the gear unit is started up a faster transition to part-load or normal operation is desired, a heart exchanger or heating element 80 can be arranged in the lubricant compensating reservoir 10 or in the lubricant tank 8. This is in particular advantageous in the case of compact gear unit housings with at most limited space for a heat exchanger or heating element 80.

The gear unit shown in the figures can in accordance with further embodiments additionally comprise filters, micro-filters, pressure relief valves, contact units, oil sensors, temperature sensors, pressure sensors or other standard components of oil supply systems. Additionally the lubricant tank 8 can be connected to the gear unit housing 1 as an under-vehicle tank either directly or with an oil return line. In this case several oil return lines with a reduced cross-section can be provided. This offers advantages in particular in gear units or systems with limited space. Moreover, because of an increased flow rate or increased pressure thanks to the reduced cross-section a suction pump for the oil return lines can be dispensed with.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A gear unit for an industrial application or a wind turbine, comprising:
    a gear unit housing;
    a drive shaft mounted in the gear unit housing and extending through a first housing opening;
    an output shaft mounted in the gear unit housing and extending through a second housing opening;
    at least one gear wheel connected to the drive shaft and at least one gear wheel connected to the output shaft, said gear wheels directly or indirectly engaging with one another;
    a lubricant tank having one side connected to a drain of a lubricant sump formed in a base of the gear unit housing and another side connected to at least one lubricant feed point for at least one member selected from the group consisting of a bearing and an adjacent one of the gear wheels;
    a lubricant compensating reservoir fluidly connected to the lubricant tank and to the at least one lubricant feed point as a function of a pressure and/or temperature of lubricant; and a lubricant pump connected to a lubricant circuit comprised of the lubricant sump, the lubricant tank, the lubricant compensating reservoir and the at least one lubricant feed point; and a control unit configured to adjust a level in the lubricant sump to a dry sump level by pressure-feed or force-feed lubrication for normal operation, to a medium sump level by splash lubrication for part-load operation, and to a high sump level by splash lubrication for emergency or spinning operation when the lubricant pump is switched off in the emergency or spinning operation.

2. The gear unit of claim 1, wherein the control unit is configured to control the level in the lubricant sump exclusively by adjusting a delivery rate of the lubricant pump.

3. The gear unit of claim 1, wherein the lubricant pump is set to full delivery rate in normal operation.

4. The gear unit of claim 1, wherein at least one of the gear wheels is immersed at least partially in lubricant in the lubricant sump in the emergency or spinning operation.

5. The gear unit of claim 1, wherein the member is arranged above the lubricant sump, and further comprising at least one lubricant collection container for lubricant collected by at least one of the gear wheels from the lubricant sump for supplying lubricant to the member in the emergency or spinning operation.

6. The gear unit of claim 5, further comprising a pipe connection connecting the lubricant collection container to the lubricant feed point for the member.

7. The gear unit of claim 5, wherein the lubricant collection container is connected to the lubricant feed point for the member via a lubricant supply channel integrated into the gear unit housing.

8. The gear unit of claim 1, wherein the dry sump level in the lubricant sump is below the gear wheels.

9. The gear unit of claim 1, wherein the lubricant compensating reservoir is connected to the lubricant tank and the at least one lubricant feed point by a connector which comprises a spring-loaded or nitrogen-loaded membrane.

10. The gear unit of claim 1, further comprising a connector having a passive restrictor for connecting the lubricant compensating reservoir to the lubricant tank and to the at least one lubricant feed point.

11. The gear unit of claim 1, wherein the lubricant pump is set in the part-load operation to a reduced delivery rate for transporting lubricant to the at least one lubricant feed point.

12. The gear unit of claim 11, wherein the control unit is configured to switch from emergency or spinning operation to part-load operation as a function of lubricant temperature and/or viscosity.

13. The gear unit of claim 1, further comprising an actuating element or passive switch element separating the lubricant compensating reservoir in part-load operation from the lubricant tank and from the at least one lubricant feed point.

14. The gear unit of claim 1, wherein the lubricant compensating reservoir has a volume corresponding to an amount of lubricant in the lubricant sump for splash lubrication.

15. The gear unit of claim 1, wherein the lubricant compensating reservoir is filled with lubricant in normal operation and is drained in emergency or spinning operation.

16. The gear unit of claim 1, further comprising at least one of a heat exchanger and heating element arranged in at least one of the lubricant compensating reservoir and the lubricant tank.

* * * * *